(12) United States Patent
Galanty et al.

(10) Patent No.: US 12,697,621 B2
(45) Date of Patent: Aug. 4, 2026

(54) BATTERY DECONSTRUCTION APPARATUS AND METHODS

(71) Applicant: Franklin Miller Inc., Livingston, NJ (US)

(72) Inventors: William Galanty, Livingston, NJ (US); Korkmaz Oz, Randolph, NJ (US)

(73) Assignee: Franklin Miller, Inc., Livingston, NJ (US)

( * ) Notice: Subject to any disclaimer, the term of this patent is extended or adjusted under 35 U.S.C. 154(b) by 130 days.

(21) Appl. No.: 19/104,123

(22) PCT Filed: Jun. 25, 2024

(86) PCT No.: PCT/US2024/035419
§ 371 (c)(1),
(2) Date: Feb. 14, 2025

(87) PCT Pub. No.: WO2025/006471
PCT Pub. Date: Jan. 2, 2025

(65) Prior Publication Data
US 2025/0256284 A1 Aug. 14, 2025

Related U.S. Application Data

(60) Provisional application No. 63/523,326, filed on Jun. 26, 2023.

(51) Int. Cl.
*H01M 10/00* (2006.01)
*B02C 19/00* (2006.01)
(Continued)

(52) U.S. Cl.
CPC .......... *B02C 19/0056* (2013.01); *B02C 21/00* (2013.01); *B02C 23/02* (2013.01);
(Continued)

(58) Field of Classification Search
CPC ......... H01M 10/54; H01M 6/52; B02C 23/40; B02C 23/10; B02C 19/0056; B02C 23/02;
(Continued)

(56) References Cited

FOREIGN PATENT DOCUMENTS

AU 2009200812 A1 * 9/2009 ............. C22B 7/008
CN 202160644 U * 3/2012
(Continued)

OTHER PUBLICATIONS

Huang, Battery Recycling, Sep. 2009, See the Abstract. (Year: 2009).*
(Continued)

*Primary Examiner* — Nicole M. Buie-Hatcher
*Assistant Examiner* — Monique M Wills
(74) *Attorney, Agent, or Firm* — Clark Hill PLC; Ralph Selitto; Eric E. Bleich

(57) ABSTRACT

Apparatus (10) for safe and effective shredding of batteries, including lithium-ion batteries, is disclosed. The system integrates a shredding subassembly (12), an auger/screw conveyor subassembly (14), a rotary screen subassembly (16), and an optional solvent recovery/recirculation subassembly (18). Valves/actuators (26, 28) can be coordinated such that a nitrogen blanket or a vacuum is maintained within the shredding assembly and/or the other subassemblies (16, 18). Shredded battery materials are transported to the rotary screen subassembly (16) via the auger-screw conveyor assembly (14) before being washed and split into solid and liquid sub-components.

23 Claims, 7 Drawing Sheets

(51) Int. Cl.

| | |
|---|---|
| *B02C 21/00* | (2006.01) |
| *B02C 23/02* | (2006.01) |
| *B02C 23/10* | (2006.01) |
| *B02C 23/36* | (2006.01) |
| *B02C 23/40* | (2006.01) |
| *B02C 25/00* | (2006.01) |
| *H01M 10/54* | (2006.01) |

(52) U.S. Cl.
CPC .............. *B02C 23/10* (2013.01); *B02C 23/36* (2013.01); *B02C 23/40* (2013.01); *B02C 25/00* (2013.01); *H01M 10/54* (2013.01)

(58) Field of Classification Search
CPC ........... B02C 21/00; B02C 25/00; B03B 9/06; B03B 11/00; B03B 5/56; B03B 2009/066; B03B 2011/002
See application file for complete search history.

(56) References Cited

FOREIGN PATENT DOCUMENTS

| | | | |
|---|---|---|---|
| CN | 105381871 | A | 3/2016 |
| CN | 106964534 | A | 7/2017 |
| EP | 1333522 | A1 | 8/2003 |
| KR | 102450852 | B1 | 10/2022 |

OTHER PUBLICATIONS

Zhu et al, Recycling Device, Mar. 2012, See the Abstract. (Year: 2012).*

PCT International Search Report for PCT/US2024/035419 entitled "Battery Deconstruction Apparatus and Method", mailed on Oct. 18, 2024, 5 pages.

PCT Written Opinion of the International Searching Authority for PCT/US2024/035419 entitled "Battery Deconstruction Apparatus and Method," mailed on Oct. 18, 2024, 14 pages.

* cited by examiner

BATTERY DECONSTRUCTION APPARATUS AND METHODS

CROSS-REFERENCE TO RELATED APPLICATIONS

This application is a U.S. PCT National Phase entry under 35 U.S.C. 371 of International Patent Application No. PCT/US2024/035419 filed Jun. 25, 2024, which claims priority to U.S. Provisional Patent Application Ser. No. 63/523,326 filed Jun. 26, 2023, the entire disclosures of both applications being incorporated herein by reference.

FIELD OF THE INVENTION

The present invention relates to systems, including apparatus and methods, for recovering component materials from batteries, especially lithium-ion batteries.

BACKGROUND OF THE INVENTION

Due to the increase in demand for lithium-ion batteries and supply shortages for most battery materials, battery recycling has gained in importance. Unfortunately, besides the complexities associated with safe and effective recycling processes themselves, the transportation of depleted or partially depleted lithium-ion batteries to recycling facilities can be labor intensive and costly. As a result, most end of lifecycle lithium-ion batteries are not being recycled; they are either being landfilled or collected in storage.

SUMMARY OF THE INVENTION

The present invention is a system (i.e., apparatus and method) for deconstructing electric batteries, in general, but especially lithium-ion batteries, and thereby rendering them safer for transportation and eventual recycling. This system involves the shredding of spent or reject batteries at various state-of-charge ("SOC") levels and the subsequent washing and screening of the shredded battery materials, after the performance of the shredding operation.

One embodiment of the invention includes an apparatus for recycling batteries containing solid battery materials and liquid electrolyte. The apparatus comprises a shredder subassembly that including a feed hopper having a hopper inlet adapted to receive batteries to be shredded, an intermediate hopper connected to said feed hopper via a first valve, a shredding chamber connected to said intermediate hopper via a second valve, and at least one shredder at least partially contained in said shredding chamber and configured to shred the solid battery materials into shredded battery materials. The apparatus further comprises an auger subassembly adapted to receive the shredded battery materials from said shredder subassembly, and a rotary screen subassembly, adapted to receive the shredded battery materials via said auger subassembly. The rotary screen subassembly includes a housing having an inlet end proximal to the auger subassembly and an outlet end distal to the auger subassembly, a cylindrical rotary screen provided with a plurality of holes and adapted for rotation via a motor, a plurality of spiral baffles provided along the length of the cylindrical rotary screen, a soaking chamber located in the cylindrical rotary screen proximal to the inlet end of the housing. The rotary screen subassembly also includes a plurality of spray nozzles contained within the housing and adapted to discharge solvent in the housing, a discharge duct adapted to receive solvent and liquid electrolyte at the inlet end of the housing and a discharge chute adapted to receive shredded battery materials at the outlet end of said housing. The apparatus further comprises a solvent recovery/recirculation subassembly, including a collection tank located below and to one side of the rotary screen subassembly, the discharge duct extending from the housing to the collection tank, whereby solvent, liquid electrolyte and shredded battery materials can flow from the rotary screen subassembly to the solvent recovery/recirculation subassembly. The solvent recovery/recirculation subassembly also incudes baffles provided on the collection tank, adapted to create a centrifugal effect on solvent, liquid electrolyte and shredded battery materials delivered to the collection tank, a waste drain adapted to receive solvent, liquid electrolyte and/or shredded battery materials, a third valve adapted to control flow through the waste drain, a separation area adapted to separate shredded battery materials from solvent, a fourth valve adapted to discharge solvent from the collection tank, and a pump adapted to transport solvent discharged from the fourth valve to the rotary screen subassembly via a recirculation duct for reuse. The apparatus also comprises a control system, adapted to coordinate operation of the first valve and second valve.

In an embodiment of the apparatus, the housing is inclined upward such that the outlet end of the housing is higher than the inlet end of said housing.

In an embodiment of the apparatus, the spray nozzles are aimed away from the soaking chamber.

In an embodiment of the apparatus, the discharge duct connects to the inlet end of the housing to receive built-up liquid from the soaking chamber.

In an embodiment of the apparatus, the auger subassembly includes a motorized screw conveyor.

In an embodiment of the apparatus, the motorized screw conveyor is angled upward towards the rotary screen subassembly.

In an embodiment of the apparatus, the hopper inlet is formed in an upper end of the feed hopper. In another embodiment, the hopper inlet is formed in a side of the feed hopper.

In an embodiment of the apparatus, the motor is located at the inlet end of the housing. In another embodiment, the motor is located at the outlet end of the housing.

In an embodiment of the apparatus, the at least one shredder includes two shredders. In one embodiment, the two shredders include a coarse shredder and a fine shredder.

In an embodiment of the apparatus, the shredding chamber is connected to the auger subassembly via a gate valve.

An embodiment of the apparatus further comprises a liquid bath in which the least one shredder is immersed.

In an embodiment of the apparatus, the rotary screen subassembly includes a rotary valve proximal to the outlet end of the housing. In one embodiment, the control system is adapted to maintain a nitrogen blanket or a vacuum between the second valve and the rotary valve.

In an embodiment of the apparatus, the shredder subassembly includes a showering means adapted to wash the shredder subassembly with intermittent showers via a series of ports on the shredder subassembly.

In an embodiment of the apparatus, the shredder subassembly includes a rotary airlock feeder adapted to control discharge of shredded battery materials from the at least one shredder.

In an embodiment of the apparatus, the at least one shredder is configured to work under vacuum, under $N_2$ or $CO_2$ blanketing, while completely submerged or with intermittent liquid showers.

In an embodiment of the apparatus, the first and second valves are each a gate valve/actuator.

In an embodiment of the apparatus, the third valve is a knife gate valve.

In an embodiment of the apparatus, the fourth valve is a bleed valve.

In an embodiment of the apparatus, the rotary screen subassembly includes an oxygen sensing system, adapted and positioned to monitor an oxygen concentration in the apparatus and configured to shut down the apparatus when excessive oxygen is detected.

Another embodiment of the invention includes an apparatus for recycling batteries containing solid battery materials and liquid electrolyte. The apparatus comprises a shredder subassembly having at least one shredder configured to shred the solid battery materials into shredded battery materials and an auger subassembly adapted to receive the shredded battery materials from said shredder subassembly. The apparatus also includes a rotary screen subassembly, adapted to receive the shredded battery materials via the auger subassembly, the rotary screen subassembly comprising a housing having an inlet end proximate to the auger subassembly and an outlet end distal to the auger subassembly, a rotary screen provided with a plurality of holes and adapted for rotation via a motor, a plurality of spiral baffles provided along the length of the cylindrical rotary screen, and a soaking chamber located in the cylindrical rotary screen proximal to the inlet end of the housing.

Another embodiment of the invention includes a shredder subassembly. The shredder assembly comprises a feed hopper adapted to receive material to be shredded via an open end; an intermediate hopper connected to the feed hopper via a first valve; a shredding chamber connected to the intermediate hopper via a second valve; at least one shredder at least partially contained in the shredding hopper; and a rotary valve and rotary airlock feeder adapted to control discharge of shredded material from the at least one shredder.

In an embodiment of the shredder subassembly, the at least one shredder is adapted to slide in and out of the shredding chamber via an opening in the shredding hopper.

In an embodiment of the shredder subassembly, the at least one shredder is a Franklin Miller model TM 1630 shredder.

An embodiment of the shredder subassembly further comprises a liquid bath surrounding the at least one shredder.

An embodiment of the shredder subassembly further comprises a showering means adapted to wash the shredder subassembly with intermittent showers via a series of ports positioned on the shredder subassembly.

In an embodiment of the shredder subassembly, the at least one shredder includes a coarse shredder and a fine shredder.

In an embodiment of the shredder subassembly, the feed hopper includes a hopper inlet adapted to receive material to be shredded. In one embodiment, the hopper inlet is formed in an upper end of the feed hopper. In another embodiment, the hopper inlet is formed in a side of the feed hopper.

Another embodiment of the invention includes a rotary screen subassembly. The rotary screen subassembly comprises a housing having an inlet end and an outlet end opposite the inlet end; a motor coupled to the housing; a cylindrical rotary screen provided with a plurality of holes and adapted for rotation via the motor; a plurality of spiral baffles provided along a length of the cylindrical rotary screen; a soaking chamber located in the cylindrical rotary screen proximal to the inlet end of the housing; a discharge duct proximal the inlet end of the housing and adapted to receive fluid from the rotary screen and/or said soaking chamber; and a discharge chute at the outlet end of said housing.

An embodiment of the rotary screen subassembly further comprises a knife gate valve adapted to control flow through the waste drain.

In an embodiment of the rotary screen subassembly, the housing is inclined upward such that the outlet end of the housing is higher than the inlet end of the housing.

Another embodiment of the invention includes a method for recycling batteries, comprising the steps of: (a) shredding the batteries in a shredding subassembly to produce shredded batteries; (b) delivering the shredded batteries to a rotary screen subassembly via an auger subassembly; (c) transporting some of the delivered shredded batteries across a rotary screen to a terminal end of said rotary screen subassembly via a plurality of baffles in said rotary screen; and (d) washing the delivered shredded batteries by spraying a solvent with a plurality of spray nozzles.

In an embodiment of the method, the auger subassembly comprises a motorized screw auger.

An embodiment of the method further comprises the step of separating smaller solids of the shredded batteries via a vortex flow.

An embodiment of the method further comprises the step of a directing excess liquid including a liquid component of the shredded batteries and solvent in a soaking chamber of the rotary screen.

An embodiment of the method further comprises the steps of continuously discharging liquid from the soaking chamber through holes in the soaking chamber and ejecting a waste stream from a waste drain located below the soaking chamber.

An embodiment of the method further comprises the step of separating solids from the waste stream to form a solvent stream.

An embodiment of the method further comprises the step of recycling the solvent stream when repeating the spraying step.

An embodiment of the method further comprises the step of drying the separated solids.

For safe processing and to minimize the risk of ignition, the shredder system may be designed to work under vacuum, under $N_2$ or $CO_2$ blanketing, completely submerged or with intermittent liquid showers. The shredding system can also handle lithium-ion batteries that are frozen with liquid nitrogen.

The shredder materials are selected for their non-sparking properties, while the shredding mechanism is designed to minimize recirculation of the materials to avoid short circuiting and ignition issues and to minimize the generation of fine particles. One or two-stage shredding is employed to obtain the desired particle size, while minimizing dust and heat buildup.

A semi-continuous process can be employed to optimize the battery shredding process, while increasing its safety. In the performance of such a process, a series of valves can be sequenced to allow the introduction of the batteries without altering the controlled environment in the cutting chamber necessary for processing the batteries with various levels of leftover energy.

After shredding, the batteries are fed or conveyed into screening equipment where intensive spraying occurs in combination with a tumbling action to effectively wash the shredded battery materials with solvents compatible with battery chemistries. For example, a rotating screen can be used to suspend the batteries as they are subjected to the washing and separating action of spray nozzles.

After solvent and liquid electrolyte are separated, the resulting solids can then be dried in a dryer. After the drying process, the solids are rendered safe for transportation.

In another version of the system, a recirculation subassembly is added to minimize the solvents used. The recirculation subassembly can include, for example, a recirculation tank, a pump, piping, and valves.

In another version of the system, solvent washing is included in the shredding process via spray nozzles located in the process area of the shredder and/or in the infeed hopper.

BRIEF DESCRIPTION OF THE DRAWINGS

For a more complete understanding of the present invention, reference is made to the following detailed description of various representative embodiments considered in conjunction with the accompanying drawings, in which.

DETAILED DESCRIPTION OF THE INVENTION

Figure 1:
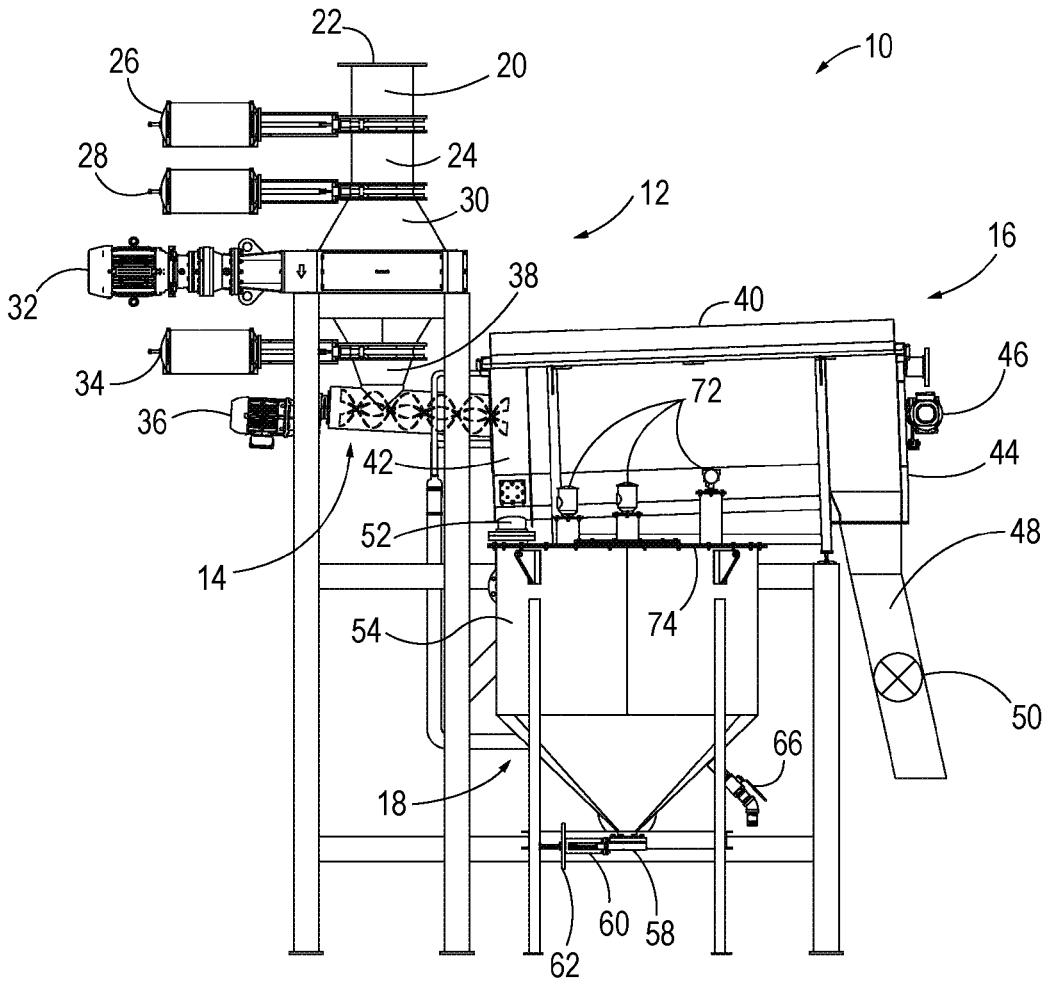
FIG. 1 is a front elevational view of a system for recovering component materials from lithium-ion batteries, the system being constructed in accordance with one representative embodiment of the present invention which, as illustrated in FIG. 1, includes a shredding subassembly, an auger subassembly, a rotary screen subassembly, and a solvent recovery/recirculation subassembly.

The aforementioned representative embodiments of the present invention will now be discussed in more detail by referring to the drawings that accompany the present application. In the accompanying drawings, various embodiments are illustrated. It is to be understood, however, that these embodiments are merely illustrative of the invention, which can be embodied in various forms. In addition, the specific features of the illustrated embodiments are intended to be illustrative, and not restrictive. Further, the figures are not necessarily to scale, and, therefore, some features illustrated therein may be exaggerated to show details of particular components with the understanding that sizes, materials and similar details shown in the figures are intended to be illustrative and not restrictive. Therefore, specific structural and functional details illustrated in the accompanying drawings are not to be interpreted as limiting, but merely as a representative basis for teaching one skilled in the art how to make and use the embodiments disclosed and illustrated herein.

Subject matter will also be described in the following text with reference to the accompanying drawings. The subject matter described hereinafter may, however, be embodied in a variety of different forms and, therefore, such subject matter should not be construed as being limited to any of the representative embodiments described herein. Among other things, for example, the disclosed subject matter may be embodied in the form of methods, devices, components, systems and/or combinations thereof. The following detailed description is, therefore, not intended to be taken in a limiting sense.

Throughout the Specification, terms may have nuanced meanings suggested or implied in context beyond an explicitly stated meaning. Likewise, the phrase "in one embodiment" as used herein does not necessarily refer to the same embodiment and the phrases "in another embodiment" and "other embodiments" as used herein do not necessarily refer to a different embodiment. It is intended, for example, that the disclosed subject matter includes combinations of the exemplary embodiments, in whole or in part.

In general, terminology may be understood, at least in part, from usage in context. For example, terms, such as "and," "or," or "and/or," as used herein may include a variety of meanings that may depend, at least in part, upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

Figure 2:
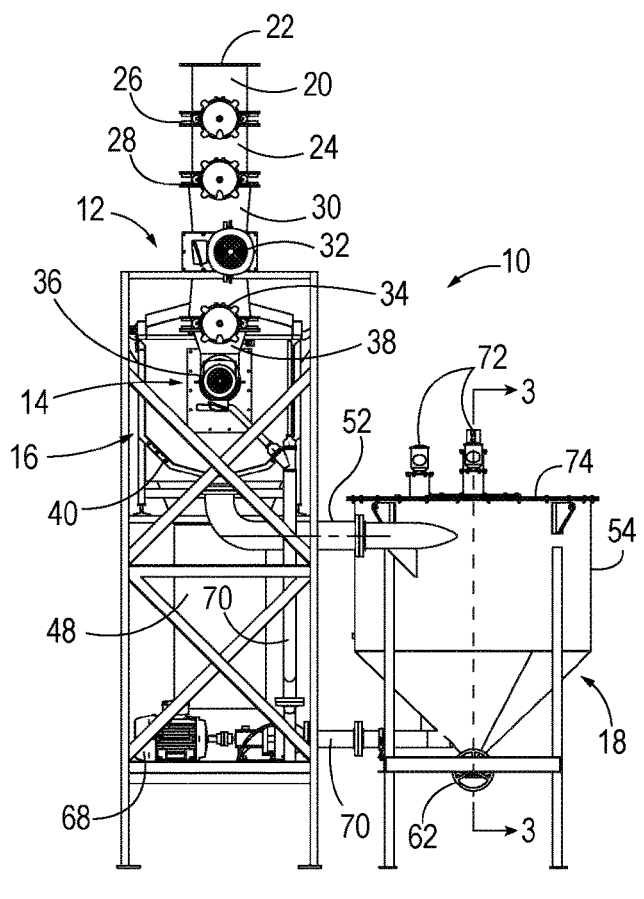
FIG. 2 is a side elevational view of the system illustrated in FIG. 1.
Figure 3:
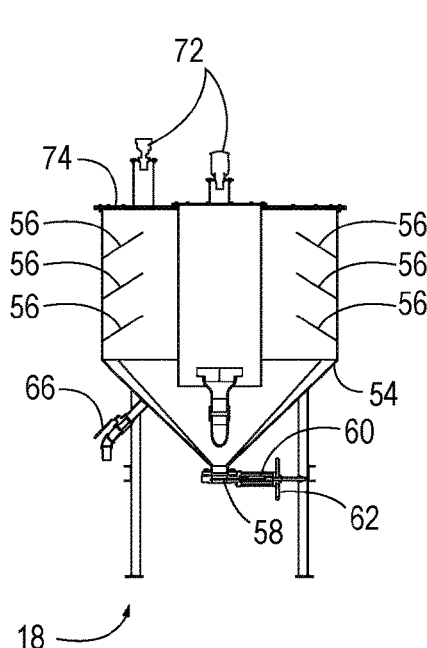
FIG. 3 is a cross-sectional view of the solvent recovery/recirculation subassembly of FIGS. 1 and 2, the cross-section being taken through section line 3-3 in FIG. 2 and looking in the direction of the arrows.

The Embodiment of FIGS. 1-3

Referring to FIGS. 1-3, there is shown a system (i.e., assembly) 10 for recovering materials from lithium-ion batteries, which system includes a shredding subassembly 12, an auger (i.e., screw conveyor) subassembly 14, a rotary screen subassembly 16, and an optional solvent recovery/recirculation subassembly 18. What follows is a detailed description of each of these subassemblies.

The Shredding Subassembly

With continued reference to FIGS. 1 and 2, the shredding subassembly 12 includes a feed hopper 20 having an inlet, i.e., an open upper end 22, that is sized and shaped so as to receive a plurality of used or rejected lithium-ion batteries at various state-of-charge ("SOC") levels. The batteries (not shown) are fed by gravity from the feed hopper 20 to an intermediate (i.e., collection) hopper 24 by a gate valve/actuator 26. Another gate valve/actuator 28 controls the gravity feed of the batteries from the collection hopper 24 to a shredding hopper, or shredding chamber, 30, which includes a shredder 32 (e.g., a Franklin Miller model TM 1630 shredder). The shredder 32 grinds or otherwise comminutes the batteries into reduced-size, or shredded, battery materials, which may be retained in the shredding chamber 30 by a gate valve/actuator 34.

To prevent clogging of the shredder 32, it is typically actuated before the batteries are fed to the shredding chamber 30 from the collection hopper 24. Before the gate valve/actuator 28 is opened to feed the batteries from the collection hopper 24 to the shredding chamber 30 and hence the shredder 32, the gate valve/actuator 26 is closed to prevent any additional air (i.e., oxygen) from entering the collection hopper 24 from the feed hopper 20, which is open to the atmosphere via its open upper end 22.

In order to minimize fire risks during the grinding/comminuting of the batteries, it is important to minimize the amount of oxygen that enters the system 10, in general, and the shredding chamber 30, in particular. The synchronized operation (i.e., opening and closing) of the gate valves/actuators 26, 28 achieves this safety function.

With the gate valves/actuators 28, 34 closed, nitrogen ($N_2$) is supplied to the shredding chamber 30 via one or more ports (not shown) in the shredding chamber 30, thereby creating an $N_2$ blanket as a further fire-retardant safety measure. Instead of creating an $N_2$ blanket in the shredding chamber 30, a vacuum could be created as an alternate fire-retardant safety measure. Another alternate fire-retardant safety measure would be to utilize immersion shredding or wet shredding techniques to avoid providing the shredding chamber 30 with an $N_2$ blanket or a vacuum.

The Auger Subassembly

The auger subassembly 14 includes a motorized screw conveyor 36 that receives shredded battery materials from the shredding chamber 30 via discharge chute 38. The gate valve/actuator 34 functions to control the gravity feed of the shredded battery materials from the shredding subassembly 12 to the screw conveyor 36 of the auger subassembly 14. In an alternate embodiment of the system 10, which alternate embodiment will be described hereinafter, the gate valve/actuator 34 is omitted. The primary function of the screw conveyor 36 is to convey the shredded battery materials from the shredding subassembly 12 to the rotary screen subassembly 16.

The Rotary Screen Subassembly

The rotary screen subassembly 16, which could be the SCREENMASTER® Model RT3070 manufactured by Franklin Miller in some embodiments, includes a stationary housing 40 arranged at an optional inclined angle relative to the horizontal. If the housing 40 is inclined, an inlet end 42 of the housing 40 would be located at a slightly lower elevation than an outlet end 44 of the housing 40 (see FIG. 1).

The interior of the housing 40 contains a cylindrical rotary screen (not shown) adapted for rotation by a motor 46 (see FIG. 1) located at the outlet end 44 of the housing 40. The perimeter (i.e., outer wall) of the rotary screen is provided with a multiplicity of holes (not shown) extending through the outer wall. The holes, which are arranged along the length of the rotary screen, have sizes and shapes selected to permit liquids to pass therethrough for a purpose to be described hereinafter. The rotary screen itself has an inlet end (not shown), which is adjacent the inlet end 42 of the housing 40, and an outlet end (not shown), which is adjacent the outlet end 44 of the housing 40.

Spiral baffles (not shown) extend along the length of the rotary screen from its inlet end to its outlet end. Upon rotation of the rotary screen, the spiral baffles transport solids from the inlet end 42 of the housing 40 to the outlet end 44 of the housing 40.

The first section of the rotary screen proximate the inlet end 42 of the housing functions as a soaking (or bath) chamber (not shown) for the shredded battery materials received by the rotary screen from the inlet end 42 of the housing 40. An inner wall (not shown) of the housing 40 is provided with an array of spray nozzles (not shown) surrounding the perimeter of the rotary screen, except for its initial section containing the aforementioned soaking chamber. The spray nozzles discharge a solvent selected to promote the recycling of liquid electrolyte contained in the shredded battery materials. In use, the sprayed solvent enters the interior of the rotary screen through the holes in its perimeter, forming a pool of solvent in the soaking chamber of the rotary screen due to the inclination of the housing 40 and hence the rotary screen itself.

In order to enhance the washing of the shredded battery materials, no spray nozzles are provided in the section of the rotary screen forming the soaking chamber and hence the section containing the pool of solvent. The formation (e.g., depth) of the solvent pool in the soaking chamber of the rotary screen can be controlled (i.e., increased or decreased) by increasing or decreasing the height of the spiral baffles in the section of the rotary screen that forms the soaking chamber, which section could have holes of a reduced size compared to the holes provided in the rest (i.e., the other sections) of the rotary screen. Alternatively, or additionally, the density of the holes (e.g., holes per inch) in the section of the rotary screen forming the soaking chamber could be less than the density of the holes in the other sections of the rotary screen.

The outlet end 44 of the housing 40 has a discharge chute 48 (see FIGS. 1 and 2), which receives the solids (i.e., black mass) that are conveyed to the outlet end 44 of the housing 40 as the rotary screen is rotated by the motor 46. From the discharge chute 48, the discharged solids are supplied to a dryer (not shown) or a collection bin (not shown). By providing the discharge chute 48 with an optional rotary value 50 (shown schematically in FIG. 1) and eliminating the gate valve/actuator 34, a nitrogen ($N_2$) blanket can be formed between the gate valve/actuator 28 and the rotary valve 50 via the introduction of nitrogen gas via optional ports (not shown) in, for instance, the shredding chamber 30.

The inlet end 42 of the housing 40 has a discharge duct 52 (shown most clearly in FIG. 2), which communicates with the solvent recovery/recirculation subassembly 18. More to the point, the discharge duct 52 permits the liquid (i.e., solvent and liquid electrolyte) and shredded (and preferably smaller) solids collected in the soaking chamber of the rotary screen to be delivered to the solvent recovery/recirculation subassembly 18.

The Solvent Recirculation Subassembly

The solvent recirculation subassembly 18 is an optional component. The solvent recirculation subassembly 18 includes a collection tank 54 located below and to one side of the rotary screen subassembly 16 (see FIGS. 1-3, but especially FIG. 2). As alluded to hereinabove, the discharge duct 52 extends from the housing 40 to the collection tank 54, whereby solvent, liquid electrolyte and shredded (i.e., smaller) solids can flow from the rotary screen subassembly 16 to the solvent recovery/recirculation subassembly 18. With particular reference to FIG. 3, the collection tank 54 is provided with baffles 56 adapted to create a centrifugal effect (i.e., vortex flow) on the solvent, liquid electrolyte and smaller solids being delivered to the collection tank 54 for recovery and, at least in the case of the solvent, recirculation as described in greater detail hereinbelow. The resulting vortex flow forces the smaller solids to the perimeter (i.e., outer wall) of the collection tank 54, from where they can then flow, by gravity, to a waste drain 58 (see FIGS. 1 and 3). A knife gate valve 60 (see again FIGS. 1 and 3) can be opened and closed by a manually-operable handwheel 62 to thereby control (i.e., allow or disallow) the flow of the smaller solids through the waste drain 58.

Within the collection tank 54 (see FIG. 3), the solids separate from the solvent and collect in a bottom portion of the collection tank 54 (i.e., adjacent the waste drain 58). Once separated, the solvent is discharged from the collection tank 54 via bleed valve 66 (see FIGS. 1 and 3), while a pump 68 (see FIG. 2) transports the solvent through a recirculation duct 70 (see FIG. 2) to the housing 40 of the rotary screen subassembly 16 for reuse.

Figure 4:
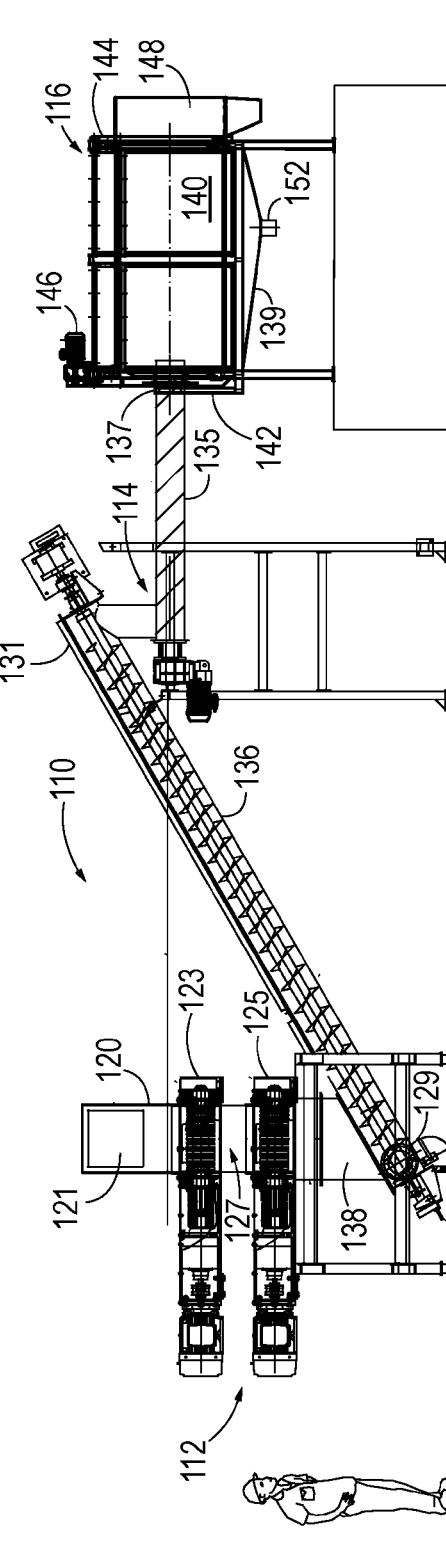
FIG. 4 is a front elevational view of a system for recovering component materials from lithium-ion batteries, the system being constructed in accordance with another representative embodiment of the present invention adapted for immersion shredding of the batteries.

The Embodiment of FIG. 4

The embodiment of the present invention depicted in FIG. 4 is a system (i.e., assembly) 110 especially adapted for the immersion shredding of lithium-ion batteries. Elements of the system 110 that correspond to the elements of the system 10 depicted in FIGS. 1-3 have the same reference numbers as those used in FIGS. 1-3, but incremented by one hundred in FIG. 4. Odd reference numbers in FIG. 4 represent elements of the assembly 110 that have no counterpart or equivalent in the assembly 10 of FIGS. 1-3. Unless otherwise described below, the system 110 includes the same or similar elements as the system 10, and operates in the same or similar fashion.

With the foregoing prefatory comments regarding the system 110 in mind, reference is now made to FIG. 4 and the system 110, which, like the system 10 of FIGS. 1-3, includes a shredding subassembly 112, an auger (i.e., screw conveyor) subassembly 114 and a rotary screen subassembly 116. Unlike the assembly 10 depicted in FIGS. 1-3, the assembly 110 depicted in FIG. 4 does not include a solvent recovery/recirculation subassembly. However, in a modified embodiment, the assembly 110 could be provided with a solvent recovery/recirculation subassembly like, or similar to, the one employed by the assembly 10 of FIGS. 1-3.

With general reference now to FIG. 4, and with specific reference to the shredding subassembly 112, a feed hopper 120 for used or rejected lithium-ion batteries is shown. Whereas the feed hopper 20 of the shredding subassembly 12 has an inlet at its open upper end 22, the feed hopper 120 has a side inlet 121.

Another difference between the shredding subassemblies 12 and 112 involves the shredding equipment employed by each subassembly. More particularly, whereas the shredding subassembly 12 employs a single shredder 32, the shredding subassembly 112 employs two shredders (i.e., a coarse shredder 123 and a fine shredder 125). Both of the shredders 123, 125 are immersed in a liquid bath 127, which is typically a water/fire retardant mixture adapted for use in the performance of immersion shredding operations.

With continuing reference to FIG. 4, but with specific reference now to the auger subassembly 114, a motorized screw conveyor 136 that receives shredded battery materials from the shredding subassembly 112 via discharge chute 138 is shown. The screw conveyor 136 is arranged at an inclined angle relative to the horizontal such that an inlet end 129 of the screw conveyor 136 is at a lower elevation than an outlet end 131. Because the system 110 is specifically adapted to perform immersion shredding operations, a liquid bath 133 is formed in the screw conveyor 136 between the inlet end 129 thereof and the outlet end 131 thereof. That said, the primary function of the screw conveyor 136 is to convey the shredded battery materials from the shredding subassembly 112 to the rotary screen subassembly 116 via another motorized screw conveyor 135.

With ongoing reference to FIG. 4, but with specific reference now to the rotary screen subassembly 116, a conventional rotary screen or drum (not shown) is mounted for rotation within a stationary housing 140, which can be oriented horizontally or at an angle relative to the horizontal. A motor 146, which is located at an inlet end 142 of the housing 140 rather than at an outlet end 144 of the housing 140, functions to rotate the rotary screen contained within the housing 140.

The inlet end 142 of the housing 140 receives a discharge end 137 of the screw conveyor 135, which delivers the shredded battery materials from the screw conveyor 136 to the rotary screen subassembly 116. The outlet end 144 of the housing 140 contains a discharge chute 148 for shredded battery materials that are comparatively coarse, while a discharge duct 152 is provided for liquid. As depicted in FIG. 4, the discharge duct 152 depends from a bottom wall 139 of the housing 140 intermediate the inlet end 142 thereof and the outlet end 144 thereof.

The Embodiments of FIGS. 5-8

Figure 5:
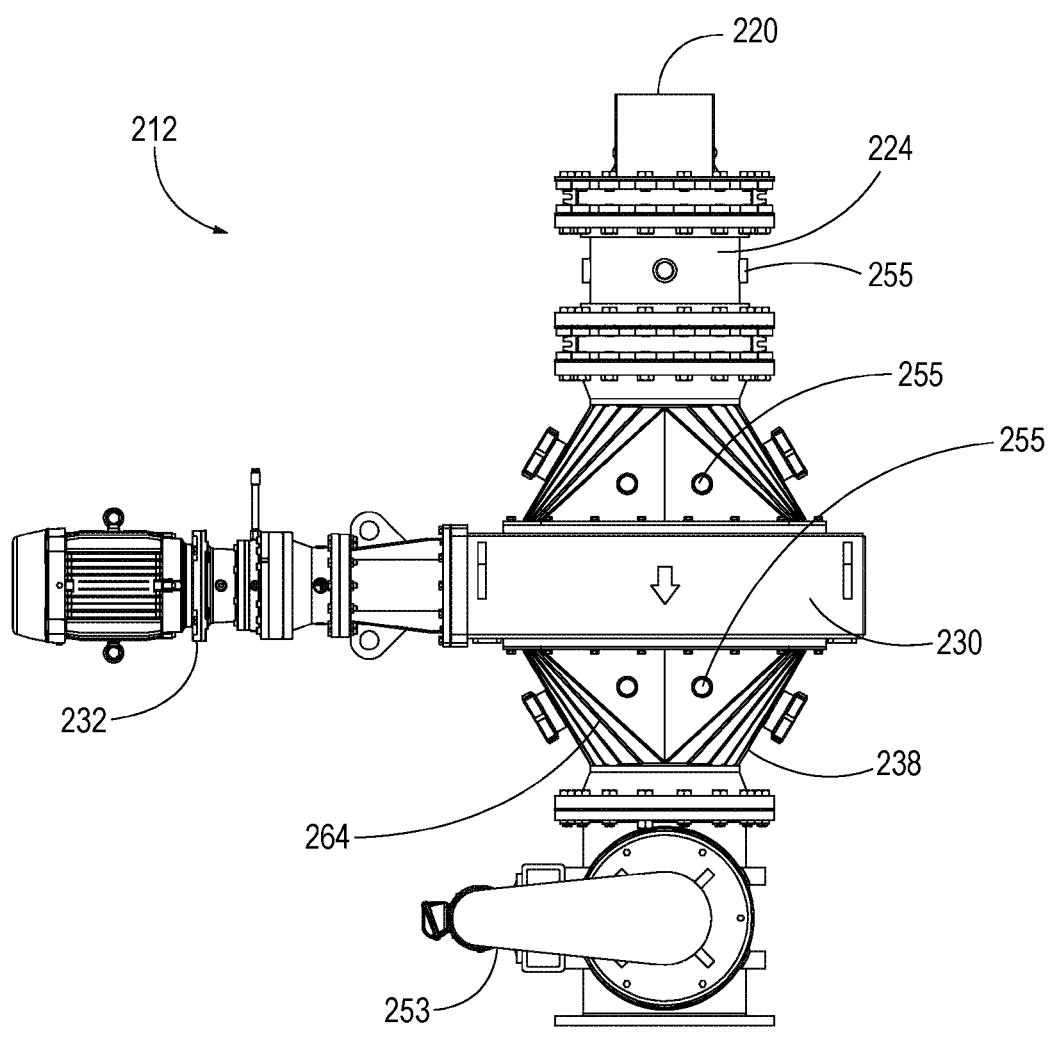
FIG. 5 is a front elevational view of a system for recovering component materials from lithium-ion batteries, the system being constructed in accordance with another representative embodiment of the present invention.
Figure 6:
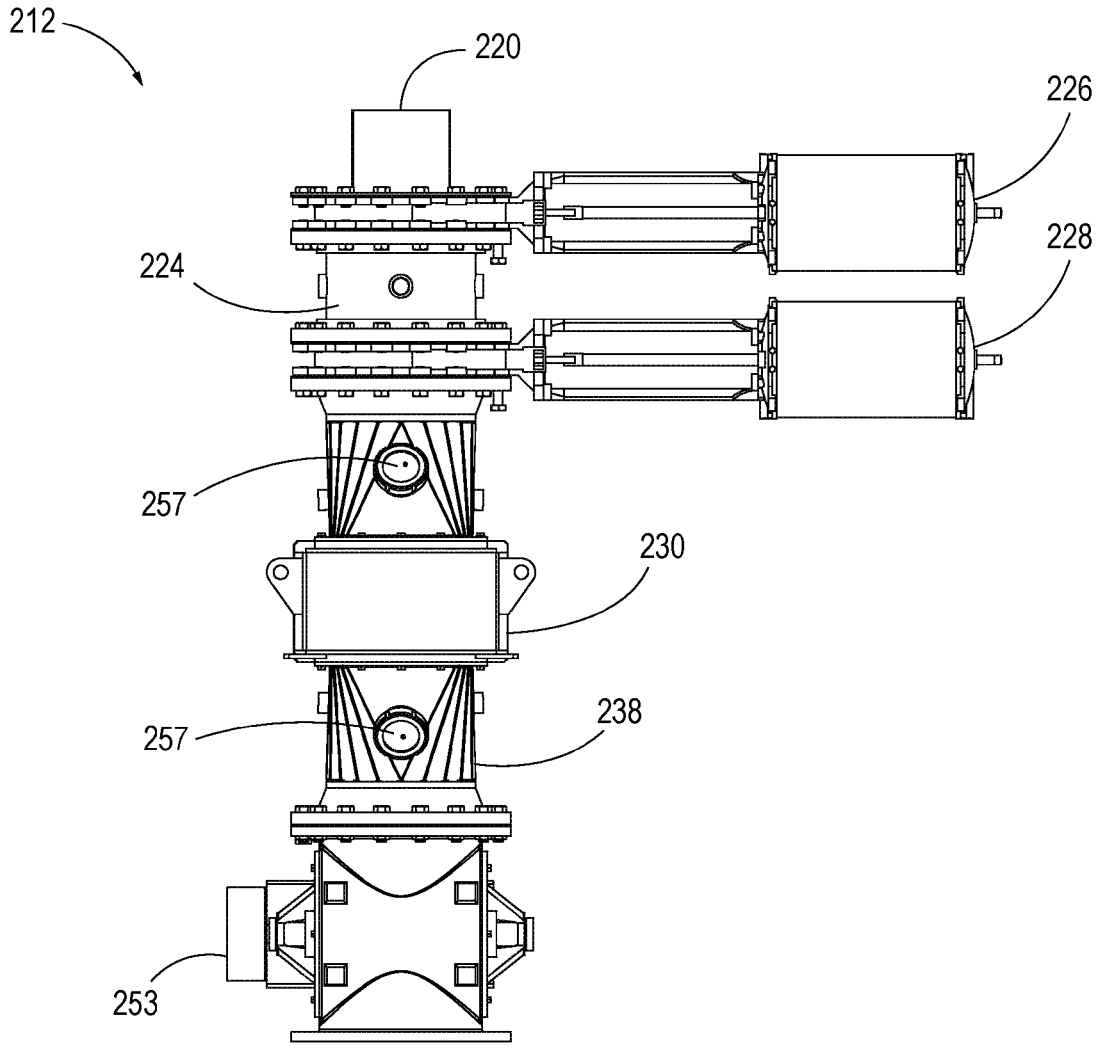
FIG. 6 is a side elevational view of the system of FIG. 5.
Figure 7:
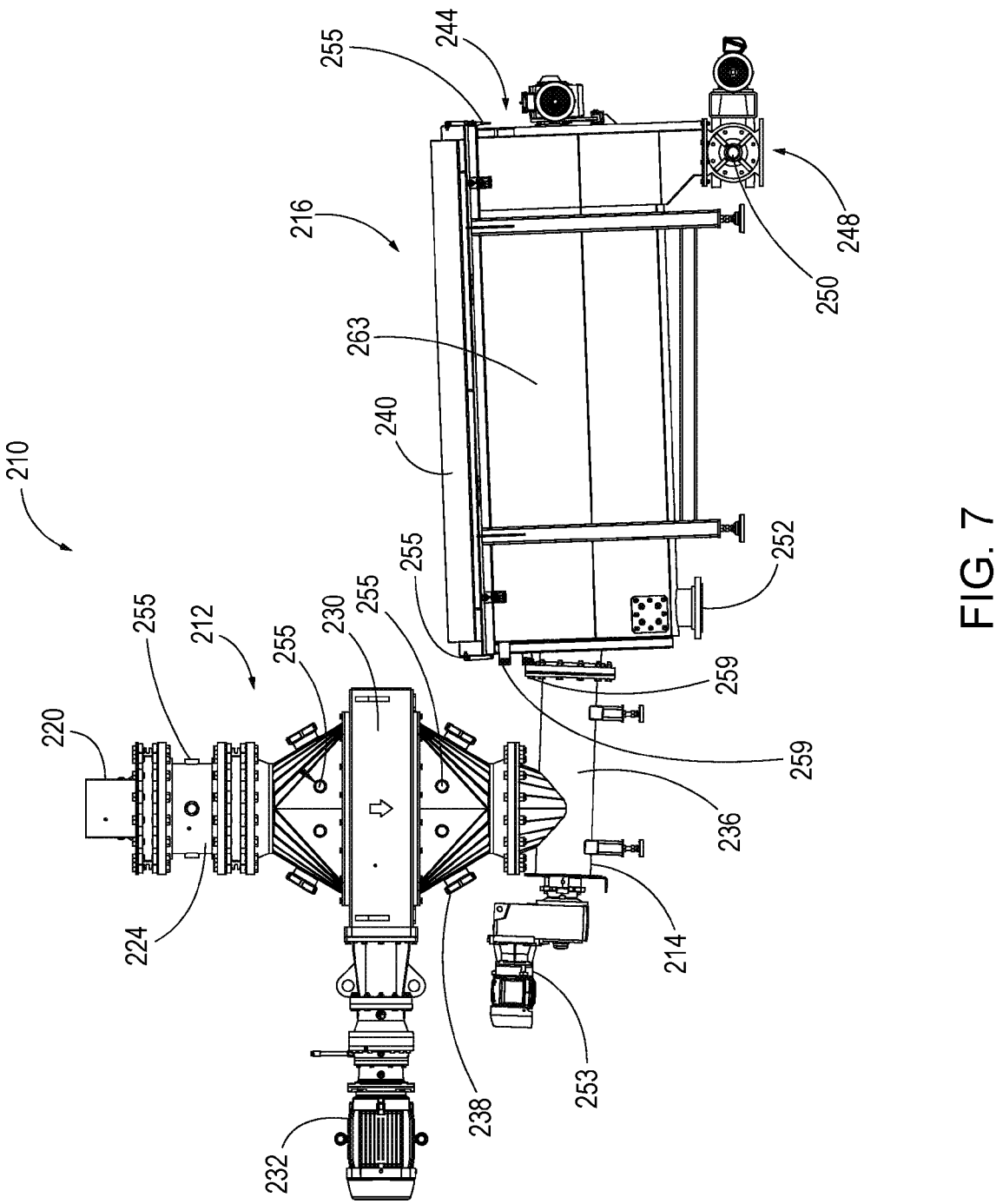
FIG. 7 is a front elevational view of a shredding subassembly for an alternative system for recovering component materials from lithium-ion batteries in accordance with an alternative embodiment of the present invention.
Figure 8:
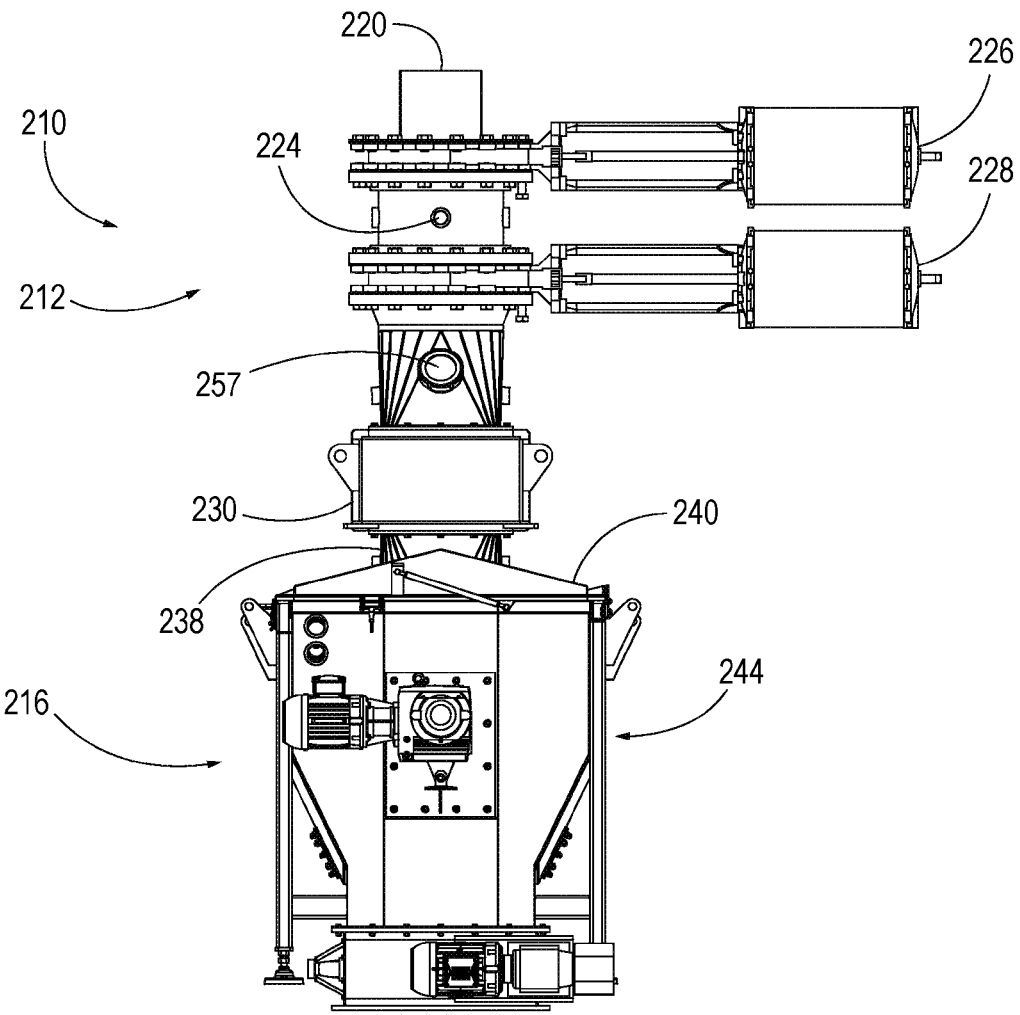
FIG. 8 is a side elevational view of the shredding subassembly of FIG. 7.

Additional implementations of embodiments of the present invention will now be discussed. Specifically, FIGS. 7 and 8, illustrate a whole system/assembly 210, similar to systems 110 and 10 above and FIGS. 5 and 6 illustrate an alternate implementation of a shredding subassembly 212. It should be understood that these embodiments and/or any features thereof could be combined with or added to the embodiments discussed above with respect to FIGS. 1-4. Further, elements of the system 210 that correspond to the elements of the system 10 depicted in FIGS. 1-3 have the same reference numbers as those used in FIGS. 1-3, but incremented by two hundred in FIGS. 5-8. Odd reference numbers in FIGS. 5-8 represent elements of the assembly 210 that have no counterpart or equivalent in the assembly 10 of FIGS. 1-3. Unless otherwise described below, the system 210 includes the same or similar elements as the system 10, and operates in the same or similar fashion.

With the foregoing prefatory comments regarding the system 210 in mind, reference is now made to FIGS. 5 and 6, which show an alternate shredding/grinder subassembly 212. The shredding subassembly 212 is equipped with a rotary airlock valve 253 at discharge chute 238. In an embodiment, rotary valve 253 could replace gate valve 34, for instance. More specifically, the rotary valve 253 could function to maintain a vacuum or nitrogen blanket in the shredding subassembly 212, for instance, by cooperating with first and second gate valve/actuators 226, 228 (i.e., equivalents of the first and second gate valves/actuators 26, 28 in FIGS. 1-3). Alternatively, the vacuum/nitrogen blanket can be maintained between valve 253 and an equivalent rotary or other valve downstream (not shown). The nitrogen blanket or vacuum could also be maintained through a plurality of ports 255 for purging purposes, through which these conditions could be introduced via an outside apparatus (not shown). Optional view ports 257 could also be provided for monitoring and assessment.

In an embodiment, a shredder 232 could be slidably mounted into a shredding hopper, or shredding chamber, 230. Battery materials to be recycled are fed into a material staging hopper 220, and then subsequently into an intermediate hopper (i.e., purge chamber) 224 before being shredded in the shredding chamber 230.

While previously fed batteries are being processed, a new batch is prepared. Once shredding is complete, the first gate valve/actuator 226 opens, allowing the batch to move into the intermediate hopper 224. At this point, the second gate valve/actuator 228 remains closed. After the first gate valve/actuator 226 closes, N$_2$ purging begins. Following the N$_2$ purging, the second gate valve/actuator 228 opens, introducing the batch into the shredding zone. This sequential operation of the gate valves/actuators 226, 228 minimizes the area to be purged and reduces N$_2$ usage. This cycle continues throughout the shredding operation.

The volume of the intermediate hopper 224 can be adjusted based on the size of the batteries or the batch size.

FIGS. 7 and 8 show a variation of the shredding subassembly 212 of FIGS. 5 and 6 in combination with an additional screw auger subassembly 214 and a rotary screen subassembly 216 to form a complete system 210. Specifically, the rotary valve 253 feeds into to a screw conveyor 236, which delivers processed material into rotary screen subassembly 216. Like the embodiments of FIGS. 1-3, the apparatus 210 is provided with a solids discharge chute 248 at an outlet end 244 of a housing 240, a liquid discharge duct 252 at the base of housing 240 and a rotary screen 263. Additional ports 255 for purging instruments could be provided on housing 240, or at other points of the rotary screen subassembly 216. Additionally, liquid wash input ports 259 could be provided on the housing (e.g., for use in combination with the previously discussed spray nozzles).

In an embodiment, the rotary screen subassembly uses pressure containment for the liquid and/or solid discharge to help contain a nitrogen blanket or a vacuum within said rotary screen subassembly 216 and screw auger subassembly 214, e.g., in cooperation with rotary valve 253. This could be done, for instance, via one or more additional rotary valves 250 placed at either discharge chute 248 or liquid discharge duct 252, or their equivalents. Similar to what is discussed above, any relevant valves (e.g., valve 253 and valve 250) could be coordinated (e.g., via a control system) to maintain the vacuum or nitrogen blanket when they are desired and prevent undesired entry of oxygen. As an additional safety measure, oxygen analyzers (not shown) could be provided and cooperate with the control system. For instance, the control system could be adapted to automatically shut down the system if dangerous oxygen levels are detected.

In some embodiments, an optional recirculation subassembly, such as the one outlined hereinabove can also be incorporated. It could be augmented with, for instance, a downstream dryer (not shown) adapted to dry the solids resulting from the rotary screen subassembly and its related process.

It will be understood that the embodiments described hereinabove are merely exemplary and that a person skilled in the art may make many variations and modifications without departing from the spirit and scope of the present invention. For instance, the embodiments described above and illustrated in FIGS. 1-8 can be utilized in connection with the deconstruction and eventual recycling of various types of electric batteries. In other words, the present invention is not limited for use in connection lithium-ion batteries only. All such various and modifications are intended to be included within the scope of the invention.

What is claimed is:

1. Apparatus for recycling batteries containing solid battery materials and liquid electrolyte, comprising:

a shredder subassembly, including a feed hopper having a hopper inlet adapted to receive the batteries to be shredded, an intermediate hopper connected to said feed hopper via a first valve, a shredding chamber connected to said intermediate hopper via a second valve, and at least one shredder at least partially contained in said shredding chamber and configured to shred the solid battery materials into shredded battery materials;

an auger subassembly adapted to receive the shredded battery materials from said shredder subassembly;

a rotary screen subassembly, adapted to receive the shredded battery materials via said auger subassembly, said rotary screen subassembly including a housing having an inlet end proximal to said auger subassembly and an outlet end distal to said auger subassembly, a cylindrical rotary screen provided with a plurality of holes and adapted for rotation via a motor, a plurality of spiral baffles provided along the length of said cylindrical rotary screen, a soaking chamber located in said cylindrical rotary screen proximal to said inlet end of said housing, a plurality of spray nozzles contained within said housing and adapted to discharge solvent in said housing, a discharge duct adapted to receive solvent and liquid electrolyte at said inlet end of said housing and a discharge chute adapted to receive shredded battery materials at said outlet end of said housing;

a solvent recovery/recirculation subassembly, including a collection tank located below and to one side of said rotary screen subassembly, said discharge duct extending from said housing to said collection tank, whereby solvent, liquid electrolyte and shredded battery materials can flow from said rotary screen subassembly to said solvent recovery/recirculation subassembly, baffles provided on said collection tank, adapted to create a centrifugal effect on solvent, liquid electrolyte and shredded battery materials delivered to said collection tank, a waste drain adapted to receive solvent, liquid electrolyte and/or shredded battery materials, a third valve adapted to control flow through said waste drain, a separation area adapted to separate shredded battery materials from solvent, a fourth valve adapted to discharge solvent from said collection tank, and a pump adapted to transport solvent discharged from said fourth valve to said rotary screen subassembly via a recirculation duct for reuse; and a control system, adapted to coordinate operation of said first valve and said second valve.

2. The apparatus of claim 1, wherein said housing is inclined upward such that said outlet end of said housing is higher than said inlet end of said housing.

3. The apparatus of claim 1, wherein said spray nozzles are aimed away from said soaking chamber.

4. The apparatus of claim 1, wherein said discharge duct connects to said inlet end of said housing to receive built-up liquid from said soaking chamber.

5. The apparatus of claim 1, wherein said auger subassembly includes a motorized screw conveyor.

6. The apparatus of claim 5, wherein said motorized screw conveyor is angled upward towards said rotary screen subassembly.

7. The apparatus of claim 1, wherein said hopper inlet is formed in an upper end of said feed hopper.

8. The apparatus of claim 1, wherein said hopper inlet is formed in a side of said feed hopper.

9. The apparatus of claim 1, wherein said motor is located at said inlet end of said housing.

10. The apparatus of claim 1, wherein said motor is located at said outlet end of said housing.

11. The apparatus of claim 1, wherein at least one shredder includes two shredders.

12. The apparatus of claim 11, wherein said two shredders include a coarse shredder and a fine shredder.

13. The apparatus of claim 1, wherein said shredding chamber is connected to said auger subassembly via a gate valve.

14. The apparatus of claim 1, further comprising a liquid bath in which said least one shredder is immersed.

15. The apparatus of claim 1, wherein said rotary screen subassembly includes a rotary valve proximal to said outlet end of said housing.

16. The apparatus of claim 15, wherein said control system is adapted to maintain a nitrogen blanket or a vacuum between said second valve and said rotary valve.

17. The apparatus of claim 1, wherein said shredder subassembly includes a showering means adapted to wash said shredder subassembly with intermittent showers via a series of ports on said shredder subassembly.

18. The apparatus of claim 1, wherein said shredder subassembly includes a rotary airlock feeder adapted to control discharge of shredded material from said at least one shredder.

19. The apparatus of claim 1, wherein said at least one shredder is configured to work under vacuum, under $N_2$ or $CO_2$ blanketing, while completely submerged or with intermittent liquid showers.

20. The apparatus of claim 1, wherein said first and second valves are gate valves.

21. The apparatus of claim 1, wherein said third valve is a knife gate valve.

22. The apparatus of claim 1, wherein said fourth valve is a bleed valve.

23. The apparatus of claim 1, wherein said rotary screen subassembly includes an oxygen sensing system, adapted and positioned to monitor an oxygen concentration in said apparatus and configured to shut down said apparatus when excessive oxygen is detected.

\* \* \* \* \*